(12) United States Patent
Oberai et al.

(10) Patent No.: US 9,292,272 B2
(45) Date of Patent: Mar. 22, 2016

(54) DIFFERENTIAL FLASH ARCHIVE INSTALLATION

(75) Inventors: Manish Oberai, Haryana (IN); Ajay Sharma, Haryana (IN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 32 days.

(21) Appl. No.: 13/994,330

(22) PCT Filed: Apr. 19, 2011

(86) PCT No.: PCT/EP2011/056199
§ 371 (c)(1),
(2), (4) Date: Feb. 7, 2014

(87) PCT Pub. No.: WO2012/079781
PCT Pub. Date: Jun. 21, 2012

(65) Prior Publication Data
US 2014/0143770 A1 May 22, 2014

(30) Foreign Application Priority Data
Dec. 17, 2010 (IN) .......................... 3015/DEL/2010

(51) Int. Cl.
G06F 9/44 (2006.01)
G06F 9/445 (2006.01)

(52) U.S. Cl.
CPC .. G06F 8/61 (2013.01); G06F 8/63 (2013.01); G06F 8/68 (2013.01); G06F 9/4401 (2013.01)

(58) Field of Classification Search
CPC ............ G06F 8/61; G06F 8/68; G06F 9/4401
USPC .................................................. 717/168, 174
See application file for complete search history.

(56) References Cited

U.S. PATENT DOCUMENTS

| | | | |
|---|---|---|---|
| 8,495,626 B1 * | 7/2013 | Hanes et al. ................... | 717/178 |
| 2005/0289533 A1 * | 12/2005 | Wang et al. ..................... | 717/168 |
| 2006/0026590 A1 * | 2/2006 | Berenberg et al. ............. | 717/175 |
| 2009/0070374 A1 * | 3/2009 | Eker et al. ................... | 707/104.1 |
| 2009/0150882 A1 * | 6/2009 | Dechovich et al. ........... | 717/178 |
| 2010/0037207 A1 * | 2/2010 | Chambers et al. ............. | 717/121 |
| 2011/0113283 A1 * | 5/2011 | Morris et al. ................... | 714/15 |
| 2011/0246981 A1 * | 10/2011 | Braun et al. ................... | 717/175 |

OTHER PUBLICATIONS

Brown et al., "Solaris to Linux Migration: A Guide for System Administrators," ibm.com/redbooks, 2006, 450pg.*
IBM et al., "Method for sequential install and removal of multiple operating systems from a network source with all user intervention at the start of the process," IPCOM000030923D, 2004, 4pg.*
Sun Microsystems, Inc., "Solaris 10 Installation Guide: Solaris Flash Archives (Creation and Installation)", Jan. 1, 2005, pp. 1-86, XP55007580.

* cited by examiner

*Primary Examiner* — Ryan Coyer
(74) *Attorney, Agent, or Firm* — Patent Portfolio Builders, PLLC (57) ABSTRACT

Methods and systems are disclosed for installing a software program in a computing device. The computing device has stored therein, a first operating system that supports an execution of the software program. In an embodiment, the method includes determining a differential software component between a second software component and a first software component. The second software component includes the first operating system and the software program and the first software component includes the first operating system. The method further includes generating a differential image corresponding to the differential software component. Subsequently, the method follows with storing the differential image and a version of a second operating system onto a bootable computer readable medium. The version of the second operating system is supportive of an extraction of the differential image onto the computing device. The method further includes accessing the bootable computer readable medium from the computing device. In a successive progression, the differential image is installed in the computing device based at least in part on the accessing without performing one or more verifications related to the first operating system prior to the installation, wherein the differential image corresponds to the software program.

23 Claims, 5 Drawing Sheets

DIFFERENTIAL FLASH ARCHIVE INSTALLATION

CROSS-REFERENCE TO RELATED APPLICATIONS

This application is a 35 U.S.C. §371 National Phase Application from PCT/EP2011/056199, filed Apr. 19, 2011, and designating the United States, which claims priority to Indian Application No. 3015/DEL/2010, filed Dec. 17, 2010. The above-mentioned applications are incorporated by reference herein.

TECHNICAL FIELD

Implementations described herein relate generally to computing devices with operating systems, and more particularly, to installation of differential flash archives of application software in the computing device.

BACKGROUND

Computing devices usually comprise of a hardware component and a software component. One of the basic software components is an operating system that forms an interface between one or more software applications and the hardware. Examples of popular modern operating systems for personal computers include Microsoft Windows, Apple's Mac OS X, Oracle Solaris, and GNU/Linux to name a few. Some of these operating systems such as, Hewlett-Packard HP-UX and IBM's AIX, etc. are device specific and would run only on devices or computing devices manufactured by the OS developer.

Typical software developers ship out their products (application software) using computer readable storage media, such as, a compact disc (CD) or a Digital Video Disc (DVD), etc. Such computer readable media is typically bootable that would enable a user to install the application software on a computing device. Once application software is developed, the developer keeps improvising the features and adds or modifies components of the application software to release an upgraded version of the application software.

In certain other scenarios, the installation of the application software can be done from a network or from a remote CD or DVD. For obvious reasons, a flash installation is preferred over a normal installation. In some of the operating systems, flash installation feature enables users to create a single reference installation of the operating environment on a system, which is called the master system. Subsequently, the user can replicate that installation on a number of systems, which are called clone systems. Replicating clone systems with Flash initial installation overwrites all files on the system or with a Flash update that only includes the differences between two system images (new and old version of the application software).

Conventional methods for installation of differential flash archives require a server which is an additional hardware used to install the application software over the network using Flash archive and Differential Flash archives. Yet another method for installing differential flash is Live Upgrade that works only when the existing system is already installed with application software and there is a need to change or upgrade the existing version of the application software running on the system. Such methods need either hardware at the installation site and usually take a lot of time for the system to be up and running.

Further, the above methods take a lot of time for the first time installation of the application software. A typical software installation requires the system to prompt the user for system identification requests and other installation parameters. In addition, the complete application software in current methods is installed from scratch without leaving any pre-installation procedure.

Due to at least the above-mentioned disadvantages, there is a well-felt need for systems and methods to install application software in a computing device in a time and cost efficient manner.

SUMMARY

It is an object of the invention to provide for a system and a method for a quick first time installation of an application software.

Yet another object of the present invention is to save installation time for a first time installation of application software.

Still further object of the present invention is to provide cheaper means for installation of application software.

Embodiments of methods and systems are disclosed for installing a software program in a computing device. The computing device has a first operating system stored therein that supports an execution of the software program. In an embodiment, the method includes determining a differential software component between a second software component and a first software component. The second software component includes the first operating system and the software program. The first software component includes the first operating system. The method further includes generating a differential image corresponding to the differential software component and storing the differential image and a miniaturized version of a second operating system onto a bootable computer readable medium. The second operating system is supportive of an extraction of the differential image. The method also includes accessing the bootable computer readable medium from the computing device and installing the differential image in the computing device based at least in part on the accessing without performing one or more verifications related to the first operating system prior to the installation. The differential image corresponds to the software program.

In another embodiment, the method includes accessing a bootable computer readable medium from the computing device. The bootable computer readable medium stores a differential image of the software program. Responsive to the accessing, the method includes executing a miniaturized version of a second operating system stored on the bootable computer readable medium. The second operating system is supportive of an extraction of the differential image. The method further includes installing the differential image in the computing device based at least in part on the execution. The installation skips one or more verification related to the first operating system prior to the installation and automatically acquires requisite system information for installation from the computing device.

Additional features of the invention will be set forth in the description that follows, and in part will be obvious from the description, or may be learned by the practice of the invention. The features and advantages of the invention may be realized and obtained by means of the system and combinations particularly pointed out in the appended claims. These and other features of the present invention will become more fully apparent from the following description and appended claims, or may be learned by the practice of the invention as set forth hereinafter.

BRIEF DESCRIPTION OF DRAWINGS

To further clarify the above and other advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings in which.

DETAILED DESCRIPTION

Exemplary embodiments described herein permit installation of differential flash archives in time and cost efficient manner. Existing methods and systems mandated either an additional hardware device or a live upgrade using internet connection. The disadvantages associated with the two techniques include a time-consuming process and dependence on additional hardware and connectivity requirements. Installation of application software involves extraction of the application software from scratch and then during installation, prompting a user to provide one or more installation parameters. The installation also involves one or more checks or verifications associated with the operating system pre-installed in the computing device.

In an exemplary embodiment, a bootable computer readable medium is disclosed that includes one or more differential flash images corresponding to one or more application software. The computer readable medium further includes a miniaturized version of an operating system supportive of an extraction/installation of the one or more application software from the one or more differential flash images at a computing device. The installation occurs without requiring one or more system information details and verifications related to a first operating system in the computing device.

In yet another embodiment, a system is disclosed for installing a software component on a computing device. The system includes a first operating system installed in the computing device and a storage medium in communication with the computing device. The storage medium includes a differential flash image of the software component and a miniaturized version of a second operating system. The second operating system supports an extraction/installation of the differential flash image of the software components in such a manner that the installation skips one or more system verifications and checks associated with the first operating system prior to the installation. In an implementation, the first operating system can be different from the second operating system.

Figure 1:
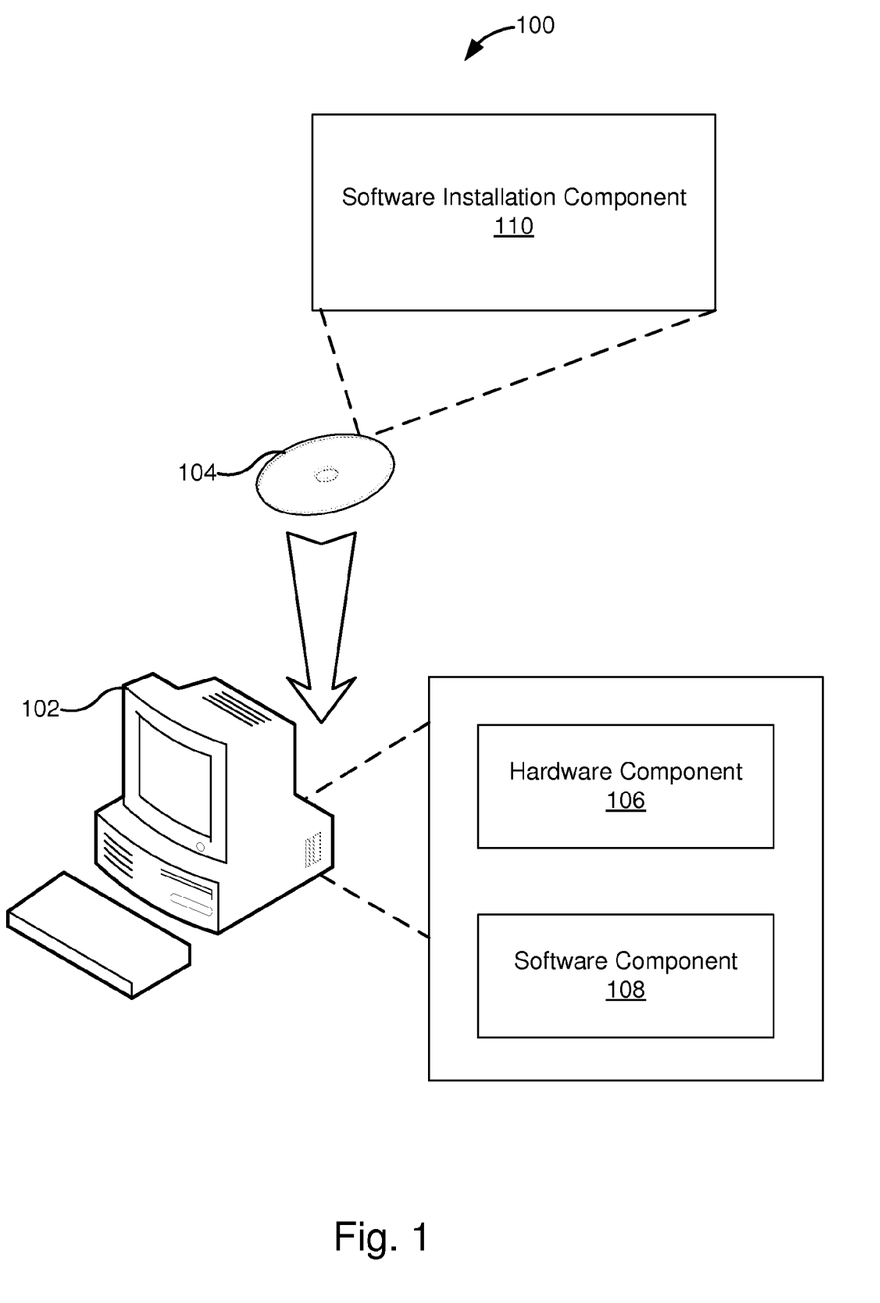
FIG. 1 illustrates an exemplary system in which the present invention is implemented.

Turning to FIG. 1, a system 100 is illustrated where the disclosed method is implemented. In an exemplary embodiment, the computing device 100 includes a computing device 102 in which an application software (or any other software program) needs to be installed for the first time. The computing device 102 includes a first operating system that provides an interface between one or more software applications and the hardware and supports an execution of any software application or program installed in the computing device 102. The computing device 102 may correspond to a laptop, a desktop, a mobile device, a personal digital assistant (PDA), a palmtop, a notebook, a tablet PC or the any other device. It may be appreciated that any general computing device with a basic operating system installed therein may be considered for the purpose of the ongoing description.

Also shown in the figure is a computer readable medium 104 for storing one or more program codes/instructions to be executed when inserted in a reading device. Without limitations, the computer readable medium 104 may correspond to one or more of a Compact Disc (CD), a Digital Video Disc (DVD), flash memory devices, USB memory devices, external hard disks, and the like. For illustration purposes only, a DVD is shown as the computer readable medium 104 but other memory devices may be implemented without departing from the scope of the disclosed invention.

The computing device 102 would include amongst other basic components, at least a hardware component 106 and a software component 108. Any modern day computing device would have one or more processors that execute one or more set of instructions stored in memory. Accordingly, the processor, memory devices, and other known hardware devices embedded in the computing device 102 constitute the hardware component 106. In some embodiments, the computing device 102 may correspond to a special-purpose computing device implemented at network operation centers (NOC) of telecommunication networks. However, regardless of the purpose and the application of the computing device 102, there would be at least one or more application software (software program) that run on the computing device 102, the first operating system that acts as an intermediary between software applications and hardware components 106, and one or more of other utility software.

The computer readable medium 104 includes a software installation component 110 that enables a user to install application software in the computing device 102. Throughout this description, the term "computer readable medium" would include automated data medium or any other medium capable of storing data in a machine-readable format that can be accessed by an automated sensing device and capable of being turned into (practically in every case) some form of binary data. In an implementation, the mini OS corresponds to a modified version of Oracle's Solaris OS and the differential image corresponds to a differential flash image generated by using Oracles' Macromedia Flash.

In an exemplary implementation, the software installation component 110 includes a differential software component (corresponding to essential patches of the application software) and a miniaturized version of a second operating system. It is noteworthy here that the second operating system may be different from the first operating system. The second operating system is supportive of extraction/installation of the application software. The essential patches of the application software or the differential software component may be obtained by performing a delta subtraction between a second software component and a first software component. The second software component includes the first operating system and the software program to be installed. The first software component includes the first operating system.

In an embodiment, the method of installing a software program in a computing device includes determining the differential software component between the second software component and the first software component. Next, a differential image corresponding to the differential software component is generated. The differential image and a miniaturized version of the second operating system are stored onto the bootable computer readable medium 104. The second operating system is supportive of an extraction of the differential image.

The computer readable storage medium 104 is accessed from the computing device 102 and the differential image installed in the computing device 102 based at least in part on the accessing without performing one or more verifications related to the first operating system prior to the installation. In conventional systems and methods, an installation of an application software or software program takes considerable amount of time. The disclosed method eliminates the requirement of any additional hardware for installation of application software, and takes very less time for performing the same.

It may be appreciated that one or more differential images corresponding to one or more differential software components may be written on the computer readable storage medium 104. In an implementation, the application software developer may store all such patches or differential images in a centralized repository or server. An authorized user may gain access to such a server and download the required contents (patches) on to a user PC or a computing device (not shown). The contents then can be written to the compute readable storage medium 104 to be shipped to an onsite location of the computing device 102. In an embodiment, a verification can be performed for the contents downloaded to the user PC. Such verification can be for example, check sum verification, parity check, etc. The verification enables the user to ascertain the source of the software thereby preventing piracy.

Figure 2:
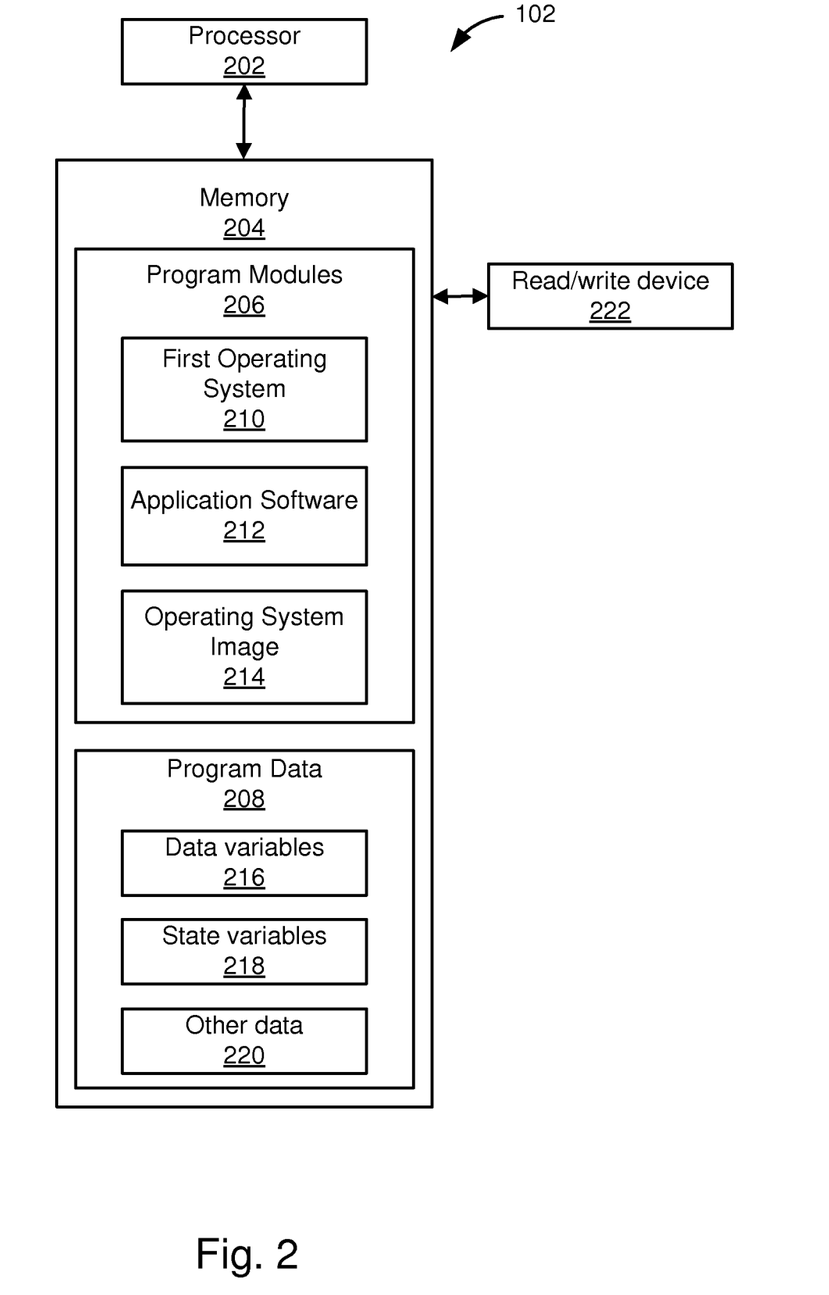
FIG. 2 illustrates an exemplary computing device in accordance with an aspect of the invention.

Turning now to FIG. 2, an exemplary computing device 102 is illustrated where an installation of application software or software program is intended. Accordingly, the computing device 102 includes a processor 202 coupled to a memory 204. The processor 204 accesses the memory 204, executes one or more program modules 206, and saves related data in program data 208. As shown, the program module 206 includes the first operating system (OS) 210, one or more application software 212 and an operating system image 214.

Execution of the one or more program modules 206 results in one or more of data variables 216, state variables 218, and other data 220 storing data relevant to such execution. It is to be noted here that the first operating system 210 may correspond to one of Microsoft Windows, Apple's Mac OS X, Oracle Solaris, and GNU/Linux. In a preferred embodiment, the first operating system 210 corresponds to OARCLE's Solaris Operating System. Application software 212 may correspond to any well known utility software pack or suite, special purpose software, etc. that run on the computing device 102. Examples include but not limited to Symantec Veritas software, Java, Oracle database binary, etc. It is a general practice to store an image of the operating system installed in a computing device. The operating system 210 maintains the system functionality and an image 214 is saved in the memory 204 of the computing device 102 for future use.

In the exemplary case of pre-installed SOLARIS operating system, first time installation of application software mandates the use of hardware (jumpstart server) or a Liveupgrade feature. Disclosed systems and methods eliminate the need of such hardware and save a lot of installation time.

Figure 3:
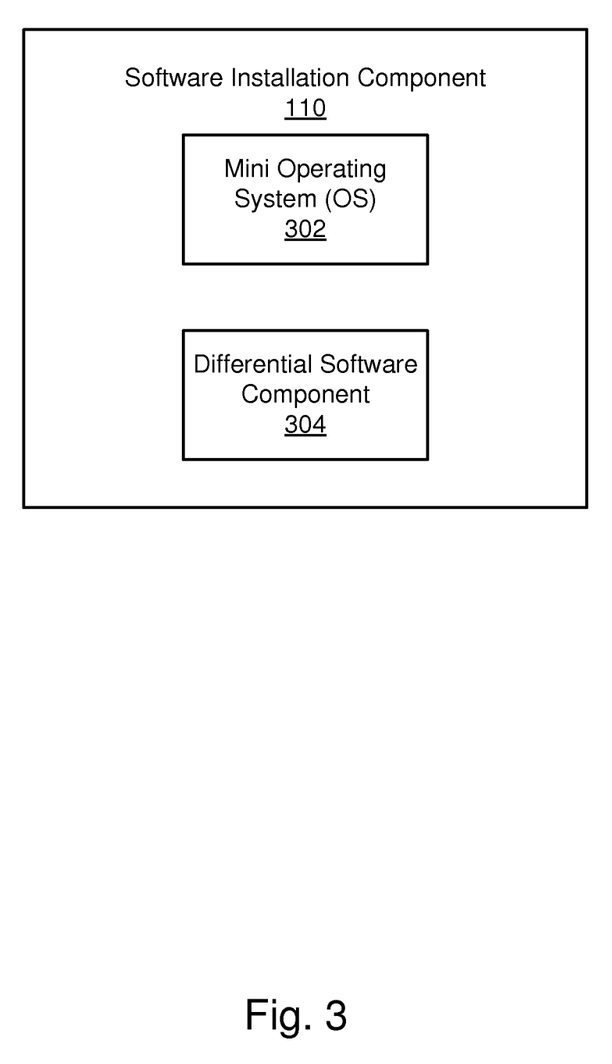
FIG. 3 illustrates exemplary software installation component according to an embodiment of invention.

Referring now to FIG. 3, an exemplary embodiment of software installation component 110 stored in the computer readable medium 104 is illustrated. Accordingly, the software installation component 110 includes a miniaturized (mini) version of a second operating system (OS) 302. It is noteworthy here that the second operating system may be different from the first operating system. The second operating system is supportive of extraction/installation of the application software. In an exemplary embodiment, the second operating system corresponds to the ORACLE's SOLARIS OS.

The software installation component 110 further includes an image 304 of the differential software component corresponding to essential patches of the application software. The essential patches of the application software or the differential software component may be obtained by performing a delta subtraction between a second software component and a first software component. The second software component includes the first operating system and the software program to be installed. The first software component includes the first operating system. Such a delta subtraction can be performed to obtain the differential software component prior to burning the CD by the 3PP provider. It may be appreciated that any known imaging techniques may be employed to create differential images (such as 304) without departing from the scope of the ongoing description. Selection of imaging techniques may depend on one or more factors, such as, but not limited to, the type of pre-installed first operating system 210, and the amount of space available on the computer readable medium 104. In the exemplary case of the second operating system being the ORACLE's SOLARIS OS, the differential images 304 are generated using ORACLE's flash imaging technique.

The mini OS 302 corresponds to a stripped down version of the base version of the second operating system modified in such a manner that when the computer readable medium 110 is inserted in a read device 222 (in FIG. 2) coupled to the computing device 102; the differential image 304 is selectively installed onto the computing device 102. In an exemplary embodiment, the mini OS 302 enables the computing device 102 to bypass or skip one or more of identification routines required to install the application software. In particular, system identification prompts are bypassed and underlying system identification parameters, such as, IP, Hostname, Netmask, etc. is preserved. The mini OS 302 renders the computer readable medium 104 bootable and saves lot of time by not performing a conventional installation of patches that goes through all the system identification prompts. In an alternative embodiment, the mini OS 302 may be modified in such a manner that an automatic verification is performed to authenticate the software installation component 110. Such verification ensures that the software installation component 110 comes from a trusted source and associated copyrights are not violated.

Figure 4:
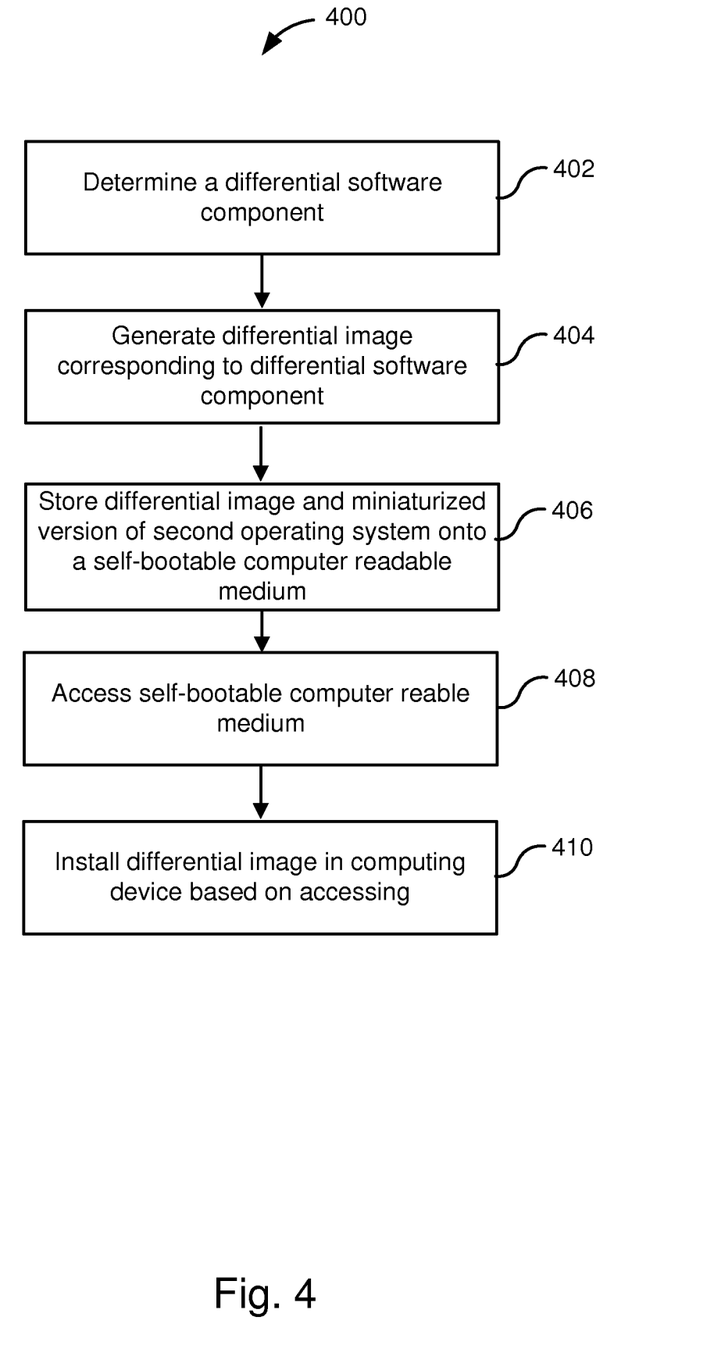
FIG. 4 illustrates an exemplary method for installing a software program in a computing device.

FIG. 4 illustrates an exemplary method for installing a software program in a computing device. The computing device 102 has stored therein a first operating system 210 that supports an execution of the software program. In an implementation, the software program corresponds to a third party program (3PP).

At block 402, a differential software component between a second software component and a first software component is determined. The second software component includes the first operating system 210 and the software program. The first software component includes the first operating system 210. In an implementation, determining differential software component includes performing a delta subtraction between the second software component and the first software component to obtain the differential software component.

At block 404, a differential image 304 corresponding to the differential software component is generated. In an embodiment, generating includes forming a flash image of the differential software component using Flash® imaging techniques.

At block 406, the differential image 304 and a miniaturized version of a second operating system 302 are stored onto a bootable computer readable medium 104. The second operating system supports an extraction of the differential image 304 into the computing device 102. In an alternative implementation, storing includes uploading the differential image and the miniaturized version of the second operating system to a centralized repository or a server. A secure access can be provided to the centralized repository. When software has to be burnt onto the computer readable storage medium 104, an authorized user accesses the centralized repository and downloads the differential image and the miniaturized version of the second operating system to a user PC or a computing device. Subsequently, the differential image and the miniaturized version of the second operating system can be burned onto the bootable computer readable medium 104. In an embodiment, checksum verification can be performed prior to burning the differential image and the miniaturized version of the second operating system.

At block 408, the bootable computer readable medium is accessed from the computing device 102. The bootable computer readable storage medium 104 is inserted in a read/write device 222. The computing device 102 reads the contents of the computer readable storage medium 104. In an embodiment, the accessing includes presenting an interface to a user of the computing device 102. The interface can provide one or more installation options associated with the software program and the computing device 102. The accessing further includes seeking for a user input that selects, from the interface, the one or more options.

At block 410, the differential image is installed in the computing device 102 based at least in part on the accessing without performing one or more verifications related to the first operating system 210 prior to the installation. The differential image corresponds to the software program and consumes less space on the computer readable storage medium 104. In an implementation, the installing includes obtaining installation details from the computing device 102. Installation details may include, system ID, host IP address, DNS IP address, gateway IP address, network services (nis, nfs) configuration, software selection, disk configuration, security settings etc.

Figure 5:
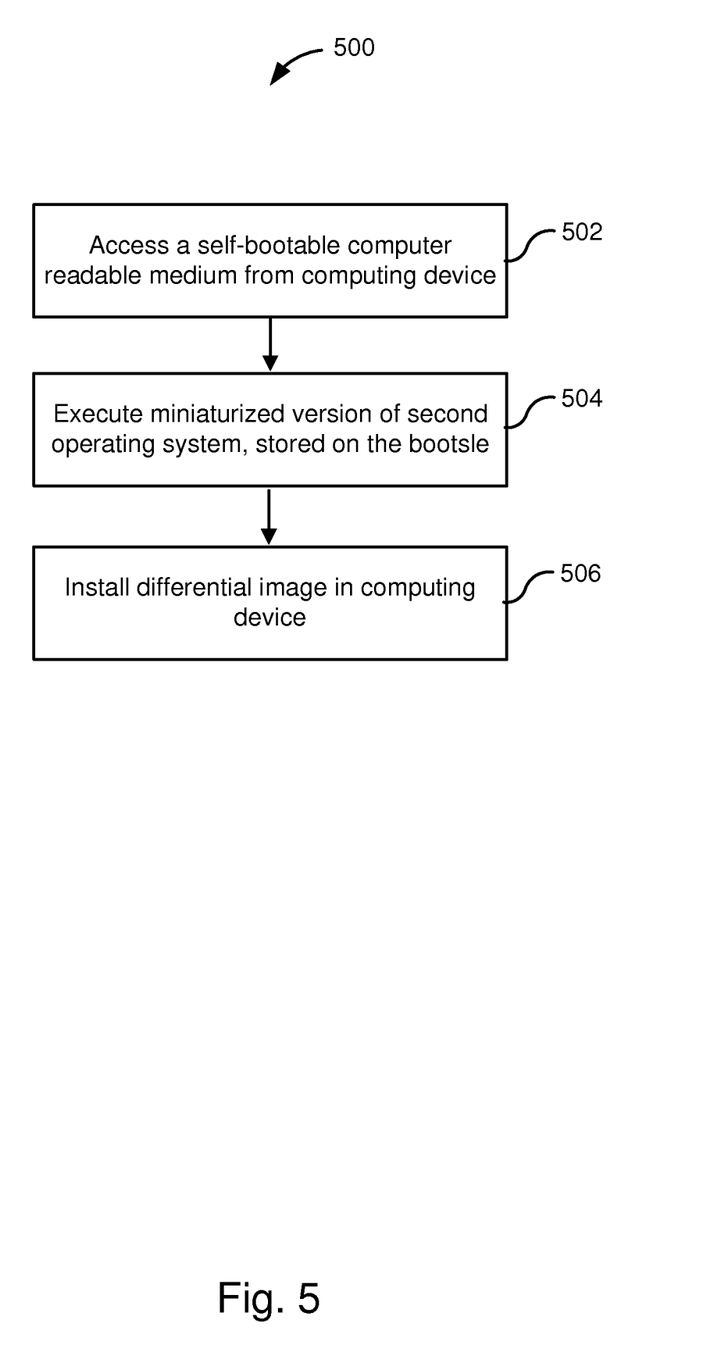
FIG. 5 illustrates yet another method for installing a software program in a computing device.

FIG. 5 illustrates yet another embodiment of a method for installing a software program in a computing device 102. The computing device 102 has stored therein a first operating system 210 that supports an execution of the software program.

At block 502, a bootable computer readable medium 104 is accessed from the computing device 102. The bootable computer readable medium 104 has stored therein a differential image 304 of the software program.

At block 504, responsive to the accessing, a miniaturized version of a second operating system 302 stored on the bootable computer readable medium 104 is executed. The second operating system supports an extraction of the differential image 304.

At block 506, the differential image 304 is installed in the computing device based at least in part on the execution, wherein the installing skips one or more verifications related to the first operating system 210 prior to the installation and acquires requisite system information for installation from the computing device 102.

In an alternative embodiment, the method 400 includes presenting, based at least on the execution, an interface to a user of the computing device 102. The interface provides one or more installation options associated with the software program and the computing device 102. The presenting includes seeking for a user input from the user that selects, from the interface, the one or more options. In such an embodiment, the installation is also based on the user inputs/the options selected therein. In an implementation, operating system related verifications can correspond to system ID check, host IP address check, DNS IP address check, gateway IP address check, etc. In the exemplary implementation, the second operating system corresponds to Solaris Operating System or Linux.

A bootable computer readable medium 104 is disclosed that embodies the principles of the invention. In an embodiment, the bootable computer readable medium 104 includes one or more differential flash images 304 corresponding to one or more application software. The bootable computer readable medium 104 further includes a miniaturized version of an operating system (e.g. second operating system) 302 supportive of an extraction/installation of the one or more application software from the one or more differential flash images 302 at the computing device 102. The installation does not require one or more system information details and verifications related to a first operating system 210 in the computing device 210.

Yet another embodiment of a bootable computer readable medium 304 is disclosed that has one or more differential flash images (e.g. 304) and a miniaturized version of an operating system (e.g. 302). When the bootable computer readable medium 304 is accessed by the computing device 102, an installation of one or more application software is performed in the computing device 102. Responsive to the access, the miniaturized version of the operating system 302 stored on the bootable computer readable medium 104 is executed at the computing device 102. Based at least on the execution, an interface is presented to a user of the computing device 102. The interface provides one or more options associated with the installation of the one or more application program. Next, the interface seeks for a user input from the user that selects, from the interface, the one or more options. Finally, the one or more differential flash images 304 are installed in the computing device 102 based at least in part on the user input without performing one or more verifications related to a first operating system 210 in the computing device 102 prior to the installation. The one or more differential flash images 304 correspond to the one or more application software to be installed respectively.

Embodiments of a system 100 are disclosed for installing a software component on a computing device 102. In one of the embodiments, the system includes a first operating system 210 installed in the computing device 102 and a storage medium 104 in communication with the computing device 102. The storage medium 104 includes a differential flash image 304 of the software component and a miniaturized version of a second operating system 302 that supports an extraction/installation of the differential flash image 304 of the software components in such a manner that the installation skips one or more system verifications and checks prior to the installation. In an implementation, the second operating system corresponds to Solaris Operating System and the first operating system 210 corresponds to one of: Solaris, Linux, Windows, and Macintosh.

The disclosed systems and methods have multiple advantages. In one or more of the above-described embodiments, a first time installation of application software can be performed by using differential flash images provided by a 3$^{rd}$ party developer. Such differential flash images can be stored on a DVD or a flash storage medium. Installation using differential flash images 304 eliminates the requirement of jumpstart server or using live upgrade functionality. In addition, a differential flash installation can be performed using a computer readable medium, such as, a DVD which is easy to ship, handle and consumes very less space. In certain embodiments, a single DVD may be used to store multiple differential flash images 304 to perform installation of multiple application software in the computing device 102 pre-installed with the first operating system 210. Due to the implementation of Mini OS 302, a lot of time is saved during differential installation of software upgrades. This is because the computing device 102 does not ask for any system identifications again from the user as the computer readable medium 104 is made bootable. All the system identification parameters are bypassed and the differential images are extracted on the hard disk of the computing device 102 where the pre-installed OS is already installed & configured. Digital rights management is made easy by using a begin script and a finish script offered by jumpstart technology, which offers the possibility to perform activities before and after the installation of differential flash archive. Therefore, the intellectual property associated with the content of the computer readable medium 104 is not compromised. Such modifications to the software installation component 110 can be used for any customization requirements, for e.g., checking the underlying environment before installation or customizing few files after the installation.

The foregoing description of implementations provides illustration and description, but is not intended to be exhaustive or to limit the invention to the precise form disclosed. Modifications and variations are possible in light of the above teachings, or may be acquired from practice of the invention.

Aspects of the invention may also be implemented in methods and/or computer program products. Accordingly, the invention may be embodied in hardware and/or in hardware/software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the invention. Thus, the operation and behavior of the aspects were described without reference to the specific software code—it being understood that one would be able to design software and control hardware to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean, "based, at least in part, on" unless explicitly stated otherwise.

While certain present preferred embodiments of the invention and certain present preferred methods of practicing the same have been illustrated and described herein, it is to be distinctly understood that the invention is not limited thereto but may be otherwise variously embodied and practiced within the scope of the following claims.

The invention claimed is:

1. A method of installing a software program in a computing device, the computing device having stored therein a first operating system that supports execution of the software program, the method comprising:
   determining a differential software component between a second software component and a first software component, the second software component comprising the first operating system and the software program and the first software component comprising the first operating system;
   generating a differential image corresponding to the differential software component;
   storing the differential image and a miniaturized version of a second operating system onto a bootable computer readable medium, the miniaturized version of the second operating system supportive of an extraction of the differential image;
   accessing the bootable computer readable medium from the computing device; and
   installing the differential image in the computing device based at least in part on accessing of the bootable computer readable medium, without performing one or more verifications related to the first operating system prior to the installation, wherein the differential image corresponds to the software program.

2. The method as claimed in claim 1, wherein the accessing comprises presenting an interface to a user of the computing device, the interface providing one or more installation options associated with the software program and the computing device.

3. The method as claimed in claim 2, wherein the accessing further comprises seeking for a user input that selects, from the interface, the one or more installation options.

4. The method as claimed in claim 1, wherein the determining comprises performing a delta subtraction between the second software component and the first software component to obtain the differential software component.

5. The method as claimed in claim 1, wherein the generating comprises forming a flash image of the differential software component using Flash® imaging.

6. The method as claimed in claim 1, wherein the storing comprises uploading the differential image and the miniaturized version of the second operating system to a centralized repository.

7. The method as claimed in claim 6, wherein the storing further comprises providing a secure access to the centralized repository.

8. The method as claimed in claim 6, wherein the storing further comprises accessing the centralized repository and downloading the differential image and the miniaturized version of the second operating system.

9. The method as claimed in claim 8, wherein the storing further comprises burning the differential image and the miniaturized version of the second operating system onto the bootable computer readable medium.

10. The method as claimed in claim 9, wherein the installing comprises obtaining installation details from the computing device.

11. The method as claimed in claim 8, wherein the storing comprises performing checksum verification prior to burning the differential image and the miniaturized version of the second operating system.

12. The method as claimed in claim 1, wherein the software program corresponds to a third party program (3PP).

13. The method as claimed in claim 1, wherein the second operating system corresponds to Solaris Operating System.

14. A method for installing a software program in a computing device, the computing device having stored therein a first operating system that supports an execution of the software program, the method comprising:
   accessing a bootable computer readable medium from the computing device, the bootable computer readable medium having stored therein a differential image of the software program;
   responsive to the accessing, executing a miniaturized version of a second operating system stored on the bootable computer readable medium, the miniaturized version of the second operating system supportive of an extraction of the differential image; and
   installing the differential image in the computing device based at least in part on the execution without performing one or more verifications related to the first operating system prior to the installation, wherein requisite system information for installation is acquired from the computing device.

15. The method as claimed in claim 14 further comprising presenting, based at least on the execution, an interface to a user of the computing device, the interface providing at least one installation option associated with the software program and the computing device.

16. The method as claimed in claim 15, wherein the presenting comprises seeking for a user input from the user that selects, from the interface, at least one of the provided options.

17. The method as claimed in claim 14, wherein the one or more verifications related to the first operating system correspond to system ID check, host IP address, DNS IP address, gateway IP address, network services (nis, nfs) configuration, software selection, disk configuration, and security settings.

18. The method as claimed in claim 1, wherein the miniaturized version of the second operating system corresponds to at least essential components of the second operating system, the essential components being sufficient to boot the computing device and to allow it to perform file extraction and file installation.

19. A bootable non-transitory computer readable medium comprising:
   at least one differential flash image corresponding to at least one application software; and
   a miniaturized version of a second operating system supportive of an extraction and installation of the at least one application software from the at least one differential flash image at a computing device without performing one or more verifications related to the first operating system prior to the installation.

20. A bootable non-transitory computer readable medium having stored thereon at least one differential flash image and a miniaturized version of an operating system, which when accessed by a computing device causes an installation of at least one application software in the computing device according to a method comprising:
   responsive to the access, executing the miniaturized version of the operating system stored on the bootable computer readable medium;
   based at least on the execution, presenting an interface to a user of the computing device, the interface providing at least one option associated with the installation of the at least one application program;
   seeking for a user input from the user that selects, from the interface, the at least one option; and
   installing the at least one differential flash image in the computing device based at least in part on the user input, without performing one or more verifications related to the first operating system prior to the installation, wherein the at least one differential flash image correspond to the at least one application software.

21. A system for installing a software component on a computing device, the system comprising:
   a first operating system installed in the computing device; and
   a non-transitory storage medium in communication with the computing device, the storage medium having:
   a differential flash image of the software component; and
   a miniaturized version of a second operating system that supports an extraction and installation of the differential flash image of the software components without performing one or more verifications related to the first operating system prior to the installation.

22. The system as claimed in claim 21, wherein the second operating system corresponds to Solaris Operating System.

23. The system as claimed in claim 21, wherein the first operating system corresponds to one of: Solaris, Linux, Windows, Macintosh OS.

* * * * *